HENRY PEREGOY.
Improvement in Milk Houses.
No. 4,720. Reissued Jan. 23, 1872.
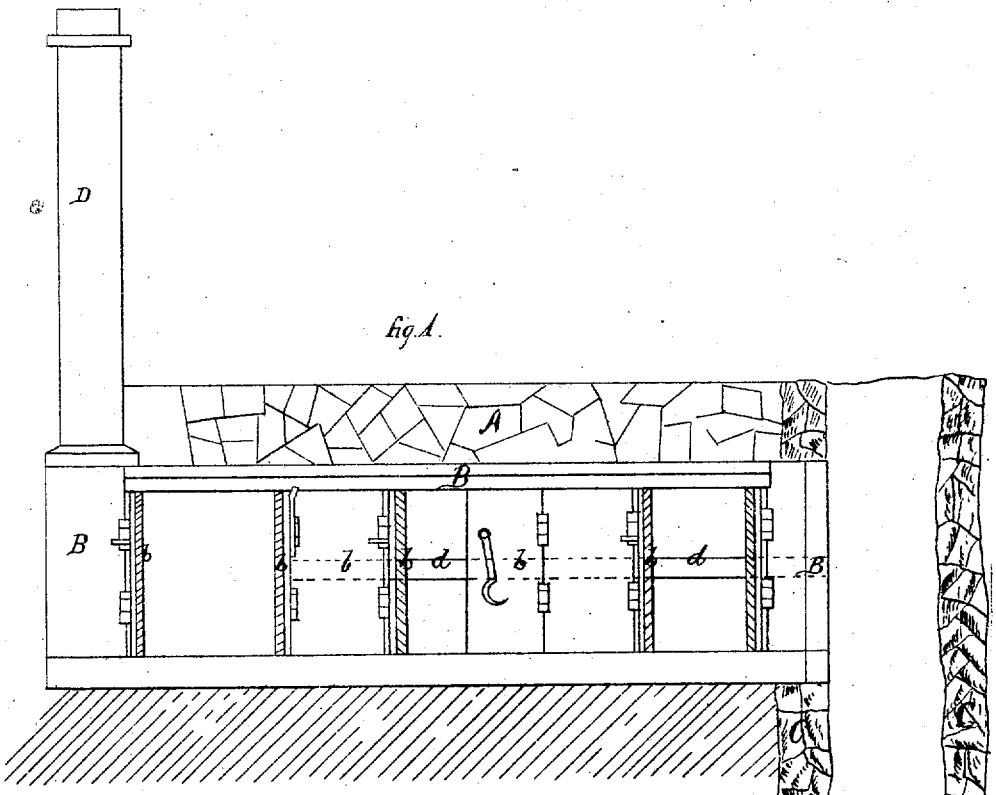
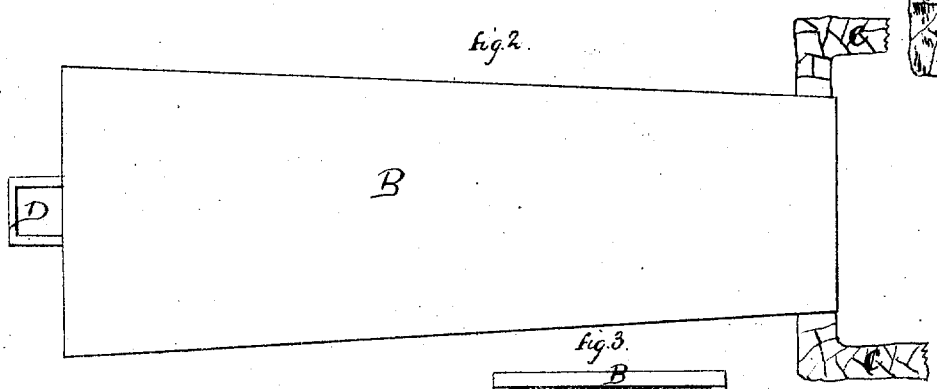
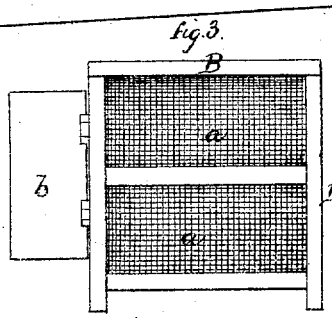
Witnesses:
James E. Hutchinson
C. L. Ewert.
Inventor
Henry Peregoy
per. Alexander Stevenson
Attorneys.
AM. PHOTO-LITHOGRAPHIC CO. N.Y. (OSBORNE'S PROCESS.)

UNITED STATES PATENT OFFICE.

HENRY PEREGOY, OF MOUNT CARMEL, MARYLAND.

IMPROVEMENT IN MILK-HOUSES.

Specification forming part of Letters Patent No. 110,784, dated January 3, 1871; reissue No. 4,720, dated January 23, 1872.

*To all whom it may concern:*

Be it known that I, HENRY PEREGOY, of Mount Carmel, county of Baltimore, State of Maryland, have invented certain new and useful Improvements in Milk-Houses; and do hereby declare that the following is a full, clear, and exact description thereof, reference being had to the accompanying drawing and to the letters of reference marked thereon making a part of this specification, in which—

Figure 1 represents a side view of the milk-box and chimney placed within a house a short distance below the surface of the earth, with one end of the chest adjacent to a well. Fig. 2 represents a plan view of the chest and chimney resting upon the surface of the earth, and the end of the chest extending to the side of a well. Fig. 3 represents an end view of that portion of the chest which extends to the side of the well.

My invention consists in a milk-chest or box of any suitable size or shape, with one end so constructed as to admit cold air through it, and the other end provided with a chimney, said chest having suitable doors and placed in close proximity to a well, so that the outward draught through the stack or chimney will draw cool air from the well up into and through the chest, as more fully hereinafter set forth.

B represents an oblong chest or box, of suitable size or shape, with one end wholly or partially open, and covered by a wire-gauze or other suitable covering, as shown at *a*, Fig. 3. This end of the chest is placed flush with the walls of the well, as shown. At the other end of the box or chest B is a tall chimney, D, which extends considerably above the top of the well-house A. The well-house A may be of any size or shape to admit the chest and allow the chimney to extend above. On one or more sides of the chest I provide a suitable number of doors, *b*, and within the chest one or more shelves, *d*, for arranging the milk-pans within the chest.

By means of this construction of chest, placed contiguous to a well, a current of cold air is had continually from the well up through the milk-house, and up and out the chimney, thereby keeping the milk or other articles placed within the chest to be kept at all times perfectly cool.

Having thus fully described my invention, what I claim, and desire to secure by Letters Patent, is—

The milk-chest or cooler B, provided with doors *b*, chimney D at one end, and with a screen, *a*, or its equivalent at the other end, and used with a well, all substantially as herein set forth.

In testimony that I claim the foregoing I have hereunto set my hand this 23d day of November, 1871.

HENRY PEREGOY.

Witnesses:
EDM. F. BROWN,
HARRY C. SCOTT.